W. G. STEVENSON.
GRINDING MILL.
APPLICATION FILED MAR. 27, 1919.
1,316,859. Patented Sept. 23, 1919.
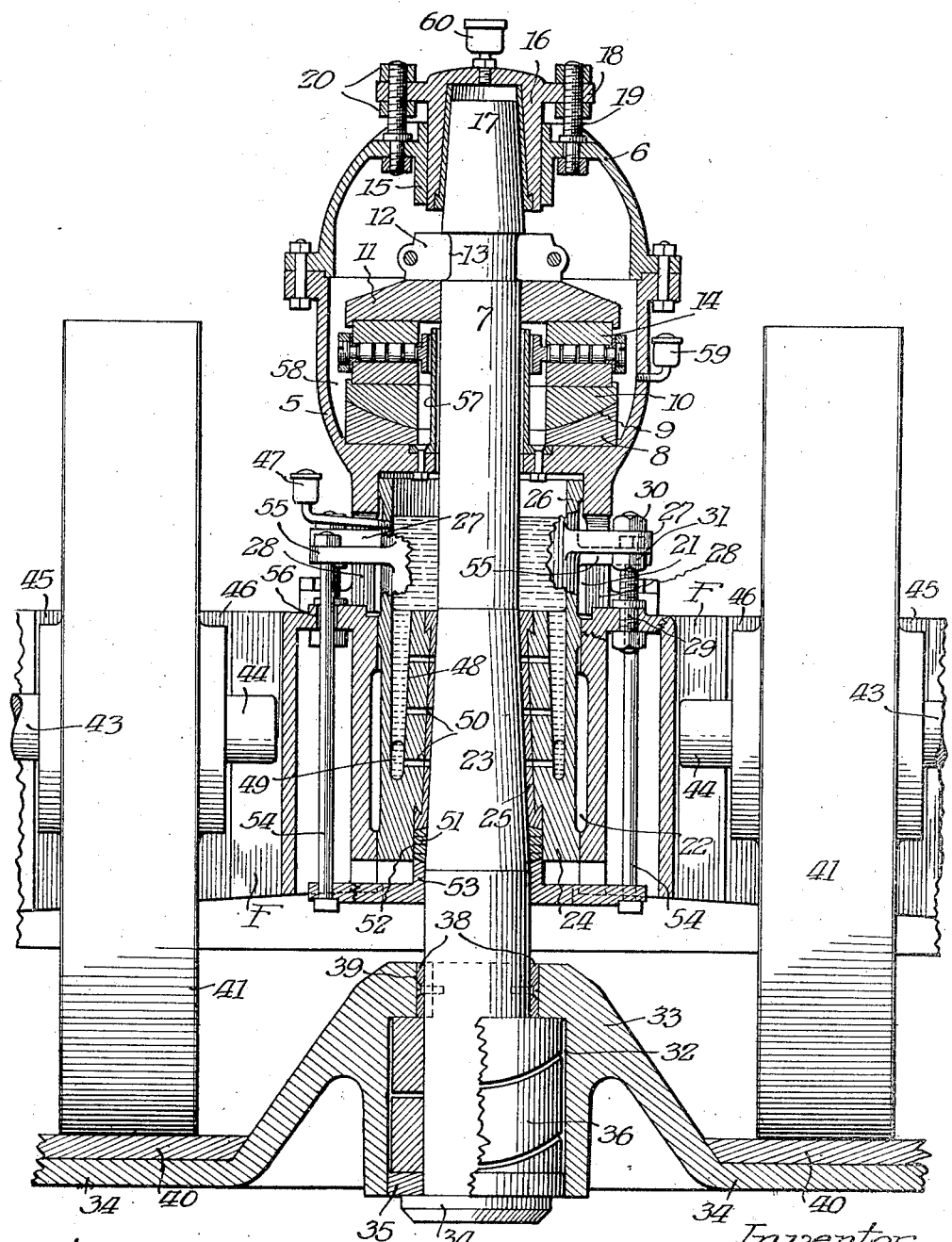
Witness:
L. W. Novander
Inventor
William G. Stevenson
By Schmidt & Hansen
attys

UNITED STATES PATENT OFFICE.

WILLIAM G. STEVENSON, OF CHICAGO, ILLINOIS.

GRINDING-MILL.

1,316,859.

Specification of Letters Patent.   Patented Sept. 23, 1919.

Application filed March 27, 1919. Serial No. 285,438.

*To all whom it may concern:*

Be it known that I, WILLIAM G. STEVENSON, a citizen of the United States, residing at Chicago, in the county of Cook and State of Illinois, have invented a certain new and useful Improvement in Grinding-Mills, of which the following is a full, clear, concise, and exact description, reference being had to the accompanying drawings, forming a part of this specification.

My invention relates to grinding mills particularly that class in which grinding rolls and a grinding pan rotate relatively to crush and grind the material between the pan and rolls.

My invention is particularly adaptable in grinding machines in which the pan is suspended by a shaft to rotate axially, with the grinding rolls either stationarily mounted or mounted to travel relative to the pan. As the rolls travel over the pan hard substances are sometimes encountered which suddenly raise the grinding rolls which then suddenly drop against the grinding pan. This sudden dropping of the rolls on the grinding pan causes the pan and its supporting shaft to be subjected to great strain.

One of the important objects of my invention is therefore to yieldably support the pan on its shaft so that the shock of the rolls suddenly dropping on the pan, will be absorbed and the shaft bearings protected. I preferably accomplished this by interposing a spring between the grinding pan and its supporting shaft.

In machines of this class where the grinding pan is supported on a shaft for axial rotation therewith provision must be made to keep the shaft in vertical alinement and to prevent side-sway or gyratory movement thereof.

Another important object of my invention is therefore to provide improved adjustable bearing support for the shaft which will take up all wear and keep the shaft at all times truly alined for the most efficient operation of the grinding mechanism.

Another feature of the invention resides in improved oiling arrangement for the bearing mechanism and simplified arrangement whereby adjustment of the bearing mechanism may be quickly and accurately made.

The various features of my invention are clearly shown on the accompanying drawings in which the figure is a vertical diametrical sectional view. On the drawing F represents a frame which in practice usually bridges over a pit. Mounted on and extending upwardly from the frame is the bearing housing 5 for which the removable cap 6 is provided. The suspension shaft 7 extends axially into the housing 5 and the cap 6.

Seated on the floor of the housing 5, is the annular bearing base 8 which has the concave upper face 9 for seating the bearing ring 10. The upper bearing ring 11 is secured to the shaft 7 by a split clamping collar 12 which engages in the reduced neck section 13 of the shaft. Between the bearing rings 9 and 11 is interposed ball bearing or roller bearing mechanism 14.

At the upper end of the housing 6 is supported the bearing sleeve 15, which receives the bushing cap 16 whose interior is conical to receive the conical head 17 of the shaft 7. Arms 18 extending from the cap bushing 16 receive threaded studs 19 extending upwardly from the cap 6, nuts 20 receiving the studs and by means of which the bushing caps may be adjusted relative to the shaft head 17.

Below the housing 5 the shaft 7 extends through the space 21 between the housing and the frame F, and the shaft then extends downwardly through the passageway 22 in the frame F. This passageway is cylindrical and the shaft section 23 within the opening is conical. Extending into the passageway 22 and surrounding the conical section 23 of the shaft is the bearing bushing frame 24 which has the lining 25 of bearing material. The bearing bushing 24 has the annular wall 26 extending upwardly into the space 21 and from the wall 26 arms 27 extend laterally out through the openings 28 in the housing 5. These arms receive threaded studs 29 extending upwardly from the frame F, and upper and lower nuts 30 and 31 engage with these studs and permit vertical adjustment of the frame 24 in the passageway 22 and with reference to the conical section 23 of the shaft.

In this way, any wear on the shaft or bearings can be very quickly and accurately taken up, and the shaft kept in true vertical alinement.

At its lower end the shaft 7 extends through the spring pocket 32 in the hub 33 of the grinding pan 34. At its lower end the shaft has the supporting flange 34 for the washer 35 which fits into the lower end of the pocket 32 and between which and the top of the pocket is interposed the compression spring 36. Secured to the shaft are one or more keys 38 which engage in the guideways 39 formed in the top wall of the hub 33 which surrounds the shaft, so that the pan structure must rotate with the shaft 7 but is free for vertical movement relative thereto.

The pan 34 supports the annular grinding plate 40 on which rest the grinding rolls 41. Each of these grinding rolls has shaft ends 43 and 44 extending therefrom into vertical guideways 45 and 46 formed in the frame F, so that these rolls are free to move bodily vertically as they rotate relatively to the pan structure.

The material to be ground is fed on to the grinding pan and as this pan revolves, the rolls are shifted bodily vertically during the crushing and grinding operation. Sometimes the rolls encounter very hard particles which suddenly raise the rolls from the pan and causes them to suddenly drop on to the pan. The rolls are very heavy and unless the impact of the rolls against the pan be cushioned, the pan structure and particularly the shaft and its bearings would be subjected to very heavy strain.

The spring 36 accomplishes such shock absorption for as the rolls suddenly drop on to the pan structure, it can yield, and the spring takes up and absorbs the shock and thus protects the shaft and its bearings against strain or injury.

In order to keep the alinement bearing surfaces while lubricated, the annular wall 26 extending upwardly from the bushing frame 24 forms a reservoir for lubricating oil which can be sent in through the oil cup 47. Ducts 48 lead downwardly from the oil reservoir to the annular well 49 in the frame 24 and from the ducts and the well oil passageways 50 lead to the bearing surface. To keep the oil from leaking out, packing material 51 is packed in the stuffing space 52 by the stuffing gland 53. The gland is drawn up tightly by means of bolts 54 extending between the glands and arms 55 extending from the annular wall 26 of the bearing frame 24. The bolts extend through openings 56 in the top wall of the frame F.

In the housing 5 the annular wall 57 secured to the housing bottom and extending up around the shaft 7 forms with the housing sides and bottom an oil well 58 supplied from the oil cup 59. The oil supplies the various bearing surfaces within the housing, and the oil cup 60 mounted on the top wall of cover 6, supplies lubricating oil for the bearing surface of the shaft head 17.

By means of the adjustable bearing cap 16 and the adjustable alining frame 24 all wear on the shaft for the bearing frame can very readily and accurately be taken up so that the shaft can be held against side sway or gyratory movement and kept at all times in perfect vertical alinement.

The shock absorber spring 36 adequately protects the shaft and its bearings from the sudden impact of the grinding rolls against the grinding pan.

I do not desire to be limited to the exact construction and arrangement shown and described as changes are no doubt possible which would still come within the scope of the invention.

Having described my invention, I claim as follows:

1. In a grinding machine, the combination of a supporting frame, a vertical shaft suspended from said frame for axial rotation, a grinding pan having yielding connections with said shaft, and grinding rolls journaled on said frame for rolling engagement with said pan.

2. In a grinding machine, the combination of a supporting frame, a vertical shaft journaled on said frame for axial rotation, a grinding pan connected with said shaft to rotate therewith but being free for vertical movement relative to said shaft, a spring for resisting such relative movement, and grinding rolls journaled on said frame for rolling engagement with said pan.

3. In a grinding machine, the combination of a supporting frame, a vertical shaft journaled on said frame for axial rotation, a grinding pan connected with said shaft to rotate therewith and being free for vertical movement relative to the shaft, grinding rolls journaled on said frame for rolling engagement with said pan, and a shock absorber spring interposed between said grinding pan and said shaft for taking up the weight of said rolls.

4. In a grinding machine, the combination of a supporting frame, a shaft suspended from said frame, a grinding pan carried by said shaft, grinding rolls, means for causing relative rotation between said rolls and grinding pan, and a spring connection between said pan and shaft for absorbing the shocks of impact between the grinding rolls and said pan.

5. In a grinding machine, the combination of a supporting frame having a vertical passageway therethrough, a bearing housing mounted on said frame over said passageway, a shaft extending through said passageway and into said bearing housing passageway, suspension bearings in said housing for said shaft, a grinding pan secured to the lower end of said shaft to rotate therewith, grinding rolls journaled on said supporting frame for engagement with said pan, the section of said shaft within said frame passageway being conical, a bushing frame within said supporting frame engaging with said conical shaft section, means for adjusting said bearing frame relative to said supporting frame whereby to aline said shaft, the upper part of said bushing frame forming an oil well, and oil ducts leading from said well to various parts of said conical bearing surface.

6. In a grinding machine, the combination of a supporting frame having a vertical passageway therethrough, a housing on said frame over said passageway, a shaft extending through said passageway into said housing, a suspension bearing in said housing for said shaft, a grinding pan on the lower end of said shaft, grinding rolls journaled in said supporting frame and engaging with said grinding pan, the section of said shaft within said supporting frame passageway being conical, an alining bearing frame inserted in said supporting frame passageway for receiving said conical shaft section, adjusting means extending between said supporting frame and said alining frame for shifting said frame within said passageway, the upper part of said alining bearing frame forming an oil well, ducts leading from said oil well to various parts of the conical bearing surface, and a stuffing box at the lower end of said alining bearing frame for preventing escape of oil.

7. In a grinding machine, the combination of a supporting frame having a vertical passageway, a housing on said supporting frame, a shaft extending through said passageway into said housing, a suspension bearing for said shaft in said housing, a grinding pan at the lower end of said shaft, grinding rolls journaled on said supporting frame and engaging with said pan, an alining bearing for said shaft in said passageway, means operable from the top of said supporting frame for adjusting said alining bearing, the upper part of said alining bearing forming an oil well, ducts leading from said oil well to various parts of said shaft bearings, and a stuffing box at the lower end of said bearings, said stuffing box being adjustable from the top of said supporting frame.

In witness whereof, I hereunto subscribe my name this 24th day of March, A. D. 1919.

WILLIAM G. STEVENSON.